(12) United States Patent
Chapel et al.

(10) Patent No.: US 11,811,733 B2
(45) Date of Patent: Nov. 7, 2023

(54) SYSTEMS AND METHODS FOR OPERATING A NETWORKING DEVICE

(71) Applicant: OVH, Roubaix (FR)

(72) Inventors: Thibault Chapel, Plouvien (FR); Tristan Groleat, Brest (FR)

(73) Assignee: OVH, Roubaix (FR)

(*) Notice: Subject to any disclaimer, the term of this patent is extended or adjusted under 35 U.S.C. 154(b) by 860 days.

(21) Appl. No.: 16/546,894

(22) Filed: Aug. 21, 2019

(65) Prior Publication Data

US 2020/0067882 A1 Feb. 27, 2020

(30) Foreign Application Priority Data

Aug. 27, 2018 (EP) ..................................... 18315024

(51) Int. Cl.
*G06F 21/00* (2013.01)
*H04L 9/40* (2022.01)
(Continued)

(52) U.S. Cl.
CPC ...... *H04L 63/0236* (2013.01); *G06F 16/2255* (2019.01); *H04L 63/1425* (2013.01); *H04L 69/22* (2013.01)

(58) Field of Classification Search
CPC . H04L 63/0236; H04L 63/1425; H04L 69/22; H04L 63/1408; H04L 63/0263; G06F 16/2255
See application file for complete search history.

(56) References Cited

U.S. PATENT DOCUMENTS

| 7,103,679 | B2 | 9/2006 | Bonn |
| 7,331,060 | B1 | 2/2008 | Ricciulli |

(Continued)

FOREIGN PATENT DOCUMENTS

| CN | 101421991 A | 4/2009 |
| CN | 105721300 A | 6/2016 |

(Continued)

OTHER PUBLICATIONS

European Search Report with regard to the counterpad EP Patent Application No. 18315022.6 completed Feb. 1, 2019.
(Continued)

*Primary Examiner* — Michael M Lee
(74) *Attorney, Agent, or Firm* — BCF LLP

(57) ABSTRACT

Methods and systems are described operating a networking device comprising a data structure associating network packet signatures with network packet metadata, the data structure comprising a temporary storage pipeline and a hash table stored in a computer-readable memory. The method comprises upon determining that network packet metadata is to be inserted in the data structure, determining a location in the hash table at which the network packet metadata is to be inserted; if the location in the hash table is an empty cell, inserting the network packet metadata in the empty cell; if the location in the hash table is not an empty cell: transferring the pre-existing network packet metadata from the hash table to the temporary storage pipeline; inserting the network packet metadata at the location of the hash table; and operating a reinsertion routine.

20 Claims, 10 Drawing Sheets

(51) Int. Cl.
*G06F 16/22* (2019.01)
*H04L 69/22* (2022.01)

(56) References Cited

U.S. PATENT DOCUMENTS

| | | | |
|---|---|---|---|
| 7,571,242 B2 | 8/2009 | Wilson | |
| 7,778,176 B2 | 8/2010 | Morford | |
| 7,933,985 B2 | 4/2011 | Kurapati et al. | |
| 8,005,869 B2 | 8/2011 | Corl et al. | |
| 8,046,496 B1 | 10/2011 | Nucci et al. | |
| 8,407,342 B2 | 3/2013 | Kurapati et al. | |
| 8,472,446 B2 | 6/2013 | Sundstrom et al. | |
| 9,171,030 B1* | 10/2015 | Arad | H04L 45/74 |
| 9,245,626 B2 | 1/2016 | Fingerhut et al. | |
| 10,511,445 B1 | 12/2019 | Rubin et al. | |
| 10,587,516 B1* | 3/2020 | Arad | G06F 16/2455 |
| 2003/0218978 A1 | 11/2003 | Brown | |
| 2005/0213570 A1* | 9/2005 | Stacy | H04L 47/32 370/389 |
| 2005/0240604 A1 | 10/2005 | Corl et al. | |
| 2008/0219181 A1 | 9/2008 | Kodialam et al. | |
| 2009/0043796 A1 | 2/2009 | Sauermann | |
| 2011/0138463 A1 | 6/2011 | Kim et al. | |
| 2013/0155918 A1 | 6/2013 | Singh et al. | |
| 2013/0343181 A1 | 12/2013 | Stroud et al. | |
| 2014/0079061 A1 | 3/2014 | Angst et al. | |
| 2014/0310307 A1* | 10/2014 | Levy | H04L 49/3009 707/769 |
| 2015/0058989 A1 | 2/2015 | Lahti et al. | |
| 2015/0117450 A1 | 4/2015 | Thibaut | |
| 2015/0341473 A1* | 11/2015 | Dumitrescu | H04L 45/7453 370/392 |
| 2015/0373167 A1* | 12/2015 | Murashov | H04L 69/16 370/392 |
| 2017/0180253 A1* | 6/2017 | Koren | H04L 45/745 |
| 2018/0191773 A1* | 7/2018 | O'Connell | H04L 47/225 |
| 2019/0182160 A1* | 6/2019 | Bengough | H04L 47/2441 |
| 2019/0377683 A1* | 12/2019 | Polychroniou | G06F 12/0897 |

FOREIGN PATENT DOCUMENTS

| | | |
|---|---|---|
| EP | 2919432 A1 | 9/2015 |
| WO | 00/28704 A1 | 5/2000 |
| WO | 2018113594 A1 | 6/2018 |

OTHER PUBLICATIONS

Bergamini et al., "Network of Shortcuts: An Adaptive Data Structure for Tree-Based Search Methods", Ecole Polytechnique Federale de Lausanne (EPFL), 1015 Lausanne, Switzerland, Intel Research, 15 JJ Thomson Avenue, Cambridge, CB3 0FD, United Kingdom, 12 pages.

European Search Report with regard to the counterpart EP Patent Application No. 18315024.2 completed Feb. 1, 2019.

Notice of Allowance with regard to the counterpart U.S. Appl. No. 16/546,806 dated Nov. 15, 2021.

English Abstract for CN 105721300 retrieved on Espacenet on Oct. 27, 2022.

English Abstract for CN101421991 retrieved on Espacenet on Oct. 27, 2022.

Office Action and Search Report (and English Translation) with regard to the counterpart CN Patent Application No. 201910790361.3 dated Oct. 19, 2022.

* cited by examiner

900

```
┌─────────────────────────────────────────────────────────┐
│ Upon determining that network data packet metadata is   │
│ to be inserted in the data structure, determining a     │
│ location in the hash table at which the network data    │──902
│ packet metadata is to be inserted, the location being   │
│ determined based on a hash function applied to a        │
│ network data packet signature associated with the       │
│ network data packet metadata                            │
└─────────────────────────────────────────────────────────┘
                            ↓
┌─────────────────────────────────────────────────────────┐
│ If the location in the hash table is an empty cell,     │──904
│ inserting the network data packet metadata in the       │
│ empty cell                                              │
└─────────────────────────────────────────────────────────┘
                            ↓
┌─────────────────────────────────────────────────────────┐
│ If the location in the hash table is not an empty cell: │──906
└─────────────────────────────────────────────────────────┘
                            ↓
┌─────────────────────────────────────────────────────────┐
│ Transferring the pre-existing network data packet       │──908
│ metadata from the hash table to the temporary storage   │
│ pipeline                                                │
└─────────────────────────────────────────────────────────┘
                            ↓
┌─────────────────────────────────────────────────────────┐
│ Inserting the network data packet metadata at the       │──910
│ location of the hash table freed from the pre-existing  │
│ network data packet metadata                            │
└─────────────────────────────────────────────────────────┘
                            ↓
┌─────────────────────────────────────────────────────────┐
│ Operating a reinsertion routine on the temporary        │──912
│ storage pipeline to reinsert the pre-existing network   │
│ data packet metadata into the hash table                │
└─────────────────────────────────────────────────────────┘
```

FIG. 9

SYSTEMS AND METHODS FOR OPERATING A NETWORKING DEVICE

CROSS-REFERENCE

The present application claims priority from European Patent Application No. 1 831 5024.2 filed on Aug. 27, 2018, the entirety of which is incorporated herein by reference.

FIELD

Embodiments described herein relate generally to systems and methods for operating networking devices, and more particularly, to systems and methods for operating a data structure associating network data signatures with network packet metadata.

BACKGROUND

Infrastructures connected to the Internet, such as datacenters, may be subjected to attacks aiming at infiltrating or impairing their operations. For example, botnet including a large number of bots can be used to cause a distributed denial of service (DDoS) attack on a datacenter. A DDoS attack may cause the datacenter to be flooded with superfluous requests. When under such an attack, the datacenter processing and communicating capabilities may become so overloaded that it is temporarily unable to provide service to legitimate users and clients. In at least one event, an attack may impose a load of one (1) terabit per second on the datacenter.

Mitigation measures are therefore required so as to reduce negative impacts of potential attacks. Such mitigation measures may consist of filtering illegitimate network packets while letting legitimate network packets access a network of the datacenter. Given a volume of network packets being routed from the Internet to a datacenter, even in instances where the datacenter is of relatively small size, filtering illegitimate network packets from legitimate network packets may require important processing resources and may impact a quality of service to be rendered to legitimate users and clients of the datacenter (e.g., a latency in providing a given service hosted at the datacenter).

Approaches aiming at reducing negative impacts of mitigation measures have been investigated but improvements may still be desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

The following summary is for illustrative purposes only, and is not intended to limit or constrain the detailed description. The following summary merely presents various described aspects in a simplified form as a prelude to the more detailed description provided below.

In certain instances, filtering illegitimate network packets from legitimate network packets may be enabled by maintaining and accessing a register associating network packet signatures with network packet metadata.

In some instances, a network packet signature may be a network address associated with a sending host or a destination host. As an example, but without being limitative, a network packet signature may be an Internet Protocol (IP) address associated with a network packet such as an Internet Protocol version 4 (IPv4) address or an Internet Protocol version 6 (IPv6) address. In another example, a network packet signature may be a section of an IP address (e.g., a network session or a host section of an IP address). In yet other examples, the network packet signature may be generated based on the IP address. In some embodiments, the network packet signature may comprise one or more elements from the list consisting of a source IP address, a destination IP address, an IP protocol (e.g., TCP or UDP), a source TCP or UDP port, a destination TCP or UDP port. In some other embodiments, the network packet signature may comprise a source IP address and/or a destination IP address associated with some metadata (e.g., a profile identifier and or a counter identifier). In some other embodiments, the network packet signature may implement elements of a white-list/black-list to be associated with a couple (e.g., a source IP address and a profile tag). Variations as to what a network packet signature may encompass will become apparent to the person skilled in the art of the present technology and should not be construed as being limitative.

In some instances, network packet metadata may be information associated or to be associated with one or more network packet signature. As an example, network packet metadata may establish a data packet classification and/or a filtering rule. Such data packet classification may allow determining whether a network packet associated with a network packet signature is legit or not. The classification and/or the filtering rule may establish how a data packet should be treated and/or what service should be performed. For example, a filter rule may be used in testing network packets entering a network of a datacenter from an outside computing device to ensure that attempts to break into a network of the datacenter may be intercepted. Alternative filtering rules may also be used to transmit traffic based on a priority. Network packets from a first host may be transmitted because the network packets have higher priority even when network packets from a second host may be dropped. In some embodiments, the network packet metadata may implement a counter of a number of packets received in a given period of time (e.g., within a second). In some embodiments, the network packet metadata may also be referred to as network packet profile tags. In some embodiments, the network packet metadata may also be referred to as network packet labels. Variations as to what network packet metadata may encompass will become apparent to the person skilled in the art of the present technology and should not be construed as being limitative.

In certain instances, the register associating network packet signatures with network packet metadata may be embodied as a data structure storing and providing access to one or more network packet metadata associated with one or more network packet signatures. As an example, a request to the data structure may comprise a network packet signature based on which an associated network packet metadata may be retrieved by the data structure and then be returned. The present technology aims at alleviating at least some of the challenges related to operating a networking device managing such a data structure in the context of filtering and/or classifying network packets at a very high volume (e.g., one (1) terabit per second) and in real-time, or at least close to real-time. Embodiments of the present technology provides a data structure and operations of such data structure allowing lookups and insertions in the data structure to be completed within a predefined time delay which is suitable for high volume, high speed, network packets filtering and/or classification. In some embodiments, the data structure is abled to access a new read/write or insert request every 5 nanosecond and a latency to return a read result is less than 200 nanoseconds. In other words, the data structure may process 200 millions requests per second.

In one aspect, various implementations of the present technology provide a method of analysing network packets for preventing attacks of a network by filtering illegitimate network packets while letting legitimate network packets access the network, the filtering being based on an association between network addresses and data packet classifications, the data packet classifications allowing determining whether a network packet is legit, the method being executed by a computing device, the computing device comprising a data structure associating the network addresses with the data packet classifications, the data structure comprising a temporary storage pipeline and a hash table stored in a computer-readable memory, the method being characterized in that it comprises:

upon determining that a data packet classification is to be inserted in the data structure, determining a location in the hash table at which the data packet classification is to be inserted, the location being determined based on a hash function applied to a network address associated with the data packet classification;

if the location in the hash table is an empty cell, inserting the data packet classification in the empty cell;

if the location in the hash table is not an empty cell:
transferring the pre-existing data packet classification from the hash table to the temporary storage pipeline;
inserting the data packet classification at the location of the hash table freed from the pre-existing data packet classification; and operating a reinsertion routine on the temporary storage pipeline to reinsert the pre-existing data packet classification into the hash table.

In one aspect, various implementations of the present technology provide a method of operating a networking device comprising a data structure associating network packet signatures with network packet metadata, the data structure comprising a temporary storage pipeline and a hash table stored in a computer-readable memory, the method comprising:

upon determining that network packet metadata is to be inserted in the data structure, determining a location in the hash table at which the network packet metadata is to be inserted, the location being determined based on a hash function applied to a network packet signature associated with the network packet metadata;

if the location in the hash table is an empty cell, inserting the network packet metadata in the empty cell;

if the location in the hash table is not an empty cell:
transferring the pre-existing network packet metadata from the hash table to the temporary storage pipeline;
inserting the network packet metadata at the location of the hash table freed from the pre-existing network packet metadata; and
operating a reinsertion routine on the temporary storage pipeline to reinsert the pre-existing network packet metadata into the hash table.

In some embodiments, the pre-existing network packet metadata is a first pre-existing network packet metadata and further comprising:

determining a reinsertion location in the hash table at which the first pre-existing network packet metadata is to be reinserted;

if the reinsertion location in the hash table is not an empty cell:
transferring a second pre-existing network packet metadata occupying the reinsertion location from the hash table to the temporary storage pipeline;
inserting the first pre-existing network packet metadata at the reinsertion location of the hash table freed from the second pre-existing network packet metadata; and
operating the reinsertion routine on the temporary storage pipeline to reinsert the second pre-existing network packet metadata into the hash table.

In some embodiments, the temporary storage pipeline comprises a first in, first out (FIFO) data buffer and the reinsertion routine is executed so that a latest pre-existing network packet metadata transferred into the temporary storage pipeline is the latest to be reinserted in the hash table.

In some embodiments, the network packet metadata is a first network packet metadata and wherein the method further comprises:

upon determining that a second network packet metadata is to be looked up in the data structure:
looking up at least one of the temporary storage pipeline and/or the hash table; and
identifying a location of the at least one of the temporary storage pipeline and/or the hash table at which the second network packet metadata is located.

In some embodiments, the network packet signature is a first network packet signature and wherein the looking up the at least one of the temporary storage pipeline and/or the hash table comprises applying the hash function to a second network packet signature associated with the second network packet metadata.

In some embodiments, the method further comprises upon determining that the second network packet metadata is to be updated, replacing the second network packet metadata by inserting a third network packet metadata at the location of the at least one of the temporary storage pipeline and/or the hash table at which the second network packet metadata is located.

In some embodiments, the method further comprises upon determining that the second network packet metadata is to be deleted, emptying the location of the at least one of the temporary storage pipeline and/or the hash table at which the second network packet metadata is located.

In some embodiments, the computer-readable memory comprises a dedicated memory for storing the temporary storage pipeline and a Random-Access Memory (RAM) for storing the hash table.

In some embodiments, the RAM comprises at least a first Quad Data Rate (QDR) SRAM memory and a second QDR SRAM memory.

In some embodiments, the hash table comprises a first sub-hash table stored in the first memory and a second sub-hash table stored in the second memory.

In some embodiments, the hash function comprises a first sub-hash function directing to the first sub-hash table and a second sub-hash function directing to the second sub-hash table.

In some embodiments, determining the location in the hash table at which the network packet metadata is to be inserted comprises applying the first sub-hash function to the network packet signature to generate a first sub-hash table location associated with the first sub-hash table and applying the second sub-hash function to the network packet signature to generate a second sub-hash table location associated with the second sub-hash table.

In some embodiments, determining if the location in the hash table is an empty cell comprises determining if one of the first sub-hash table location and the second sub-hash table location is an empty cell, and wherein inserting the network packet metadata in the empty cell comprises inserting the network packet metadata in one of the first sub-hash table location and the second sub-hash table location.

In some embodiments, determining if the location in the hash table is not an empty cell comprises determining if none of the first sub-hash table location and the second sub-hash table location is an empty cell, and wherein transferring the pre-existing network packet metadata from the hash table to the temporary storage pipeline comprises transferring the pre-existing network packet metadata from one of the first sub-hash table and the second sub-hash table to the temporary storage pipeline.

In another aspect, various implementations of the present technology provide a computer-implemented system configured to perform the method recited in the paragraphs above.

In another aspect, various implementations of the present technology provide a non-transitory computer-readable medium comprising computer-executable instructions that cause a system to execute the method recited in the paragraphs above.

In the context of the present specification, unless expressly provided otherwise, a networking device may refer, but is not limited to, a "router", a "switch", a "gateway", a "system", a "computer-based system" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIG. 9 illustrates a second flow diagram of a method for operating a networking device in accordance with embodiments of the present technology.

DETAILED DESCRIPTION

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural or functional modifications may be made, without departing from the scope of the present disclosure.

Networks of devices, such as networks housed in a data center, may comprise a variety of different networking hardware, such as routers, switches, multilayer switches, cables, and/or other networking hardware. The networking devices may service various computing devices, such as servers. The networking device may be operating a data structure relied upon in the context of filtering and/or classifying network packets.

Figure 1A:
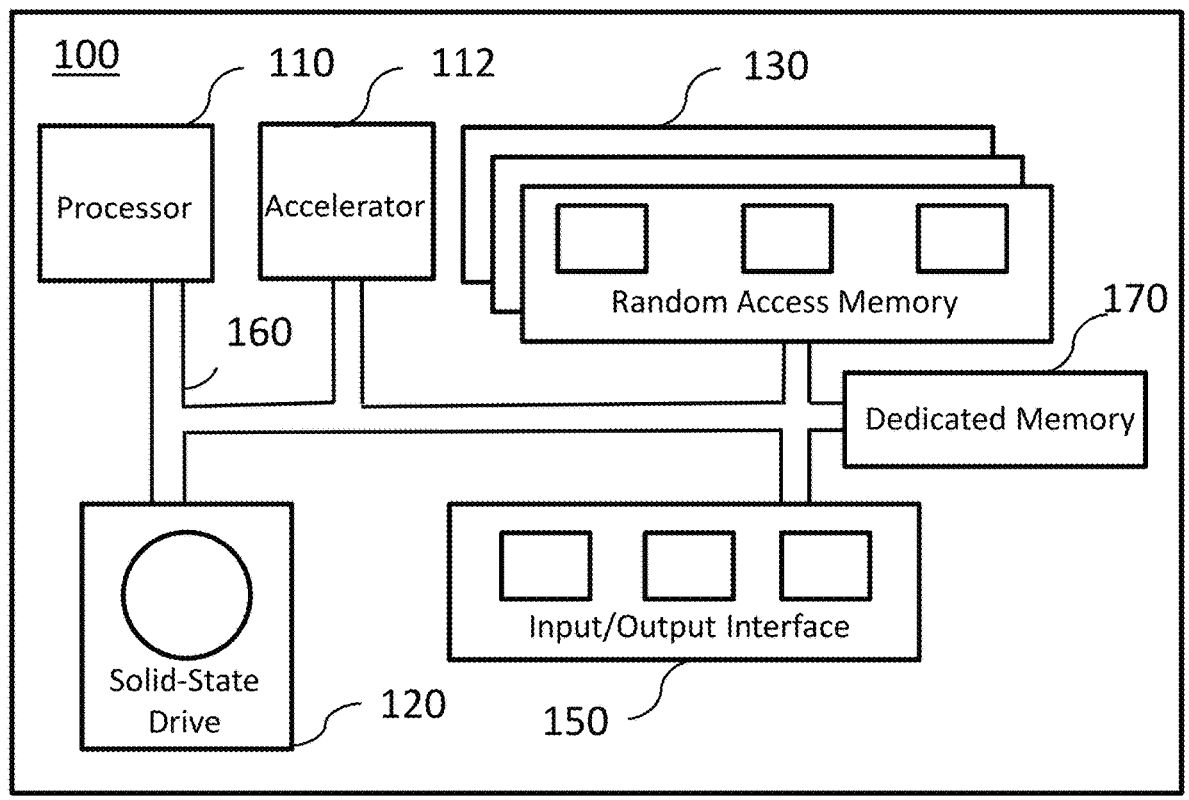
FIGS. 1A and 1B illustrate example networking devices that may be used to implement any of the methods described herein.

FIG. 1A illustrates a diagram of a computing environment 100 in accordance with an embodiment of the present technology. In some embodiments, the computing environment 100 may be implemented by any of a conventional personal computer, a server, a router, a switch, a controller, and/or an electronic device (e.g., a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a Random Access Memory (RAM) memory 130, a dedicated memory 170 and an input/output interface 150. The computing environment 100 may be a computer specifically designed for operating in a data center environment. The computing environment 100 may be a generic computer system.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may provide networking capabilities such as wired or wireless access. As an example, the input/output interface 150 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110. For example, the program instructions may be part of a library or an application. Although illustrated as a solid-state drive 120, any type of memory may be used in place of the solid-state drive 120, such as a hard disk, optical disk, and/or removable storage media.

In some embodiments of the present technology, the processor 110 may be a general purpose processor, such as a central processing unit (CPU) or a processor dedicated to a specific purpose, such as a digital signal processor (DSP). In some embodiments, the processor 110 may also rely on an accelerator 112 dedicated to certain given tasks, such as executing the method 900 set forth in the paragraph below. In some embodiments, the processor 110 or the accelerator 112 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, random access memory (RAM), and non-volatile storage. Other hardware, conventional and/or custom, may also be included.

In some embodiments of the present technology, the RAM 130 may comprise high performance memory such as, but not limited to, Quad Data Rate (QDR) SRAM memory. In some embodiments, the RAM 130 may comprise a plurality of QDR SRAM memories. In addition, in some embodiments, dedicated memory 170 may also be relied upon. Such dedicated memory 170 may be a distinct memory unit or integrated to another component. In some embodiments, the dedicated memory 170 is part of an FPGA processing unit (e.g., a register of the FPGA). In some embodiments, the dedicated memory 170 is implemented as a dedicated portion of the RAM 130. Other variations may also be envisioned without departing from the scope of the present technology.

Figure 1B:
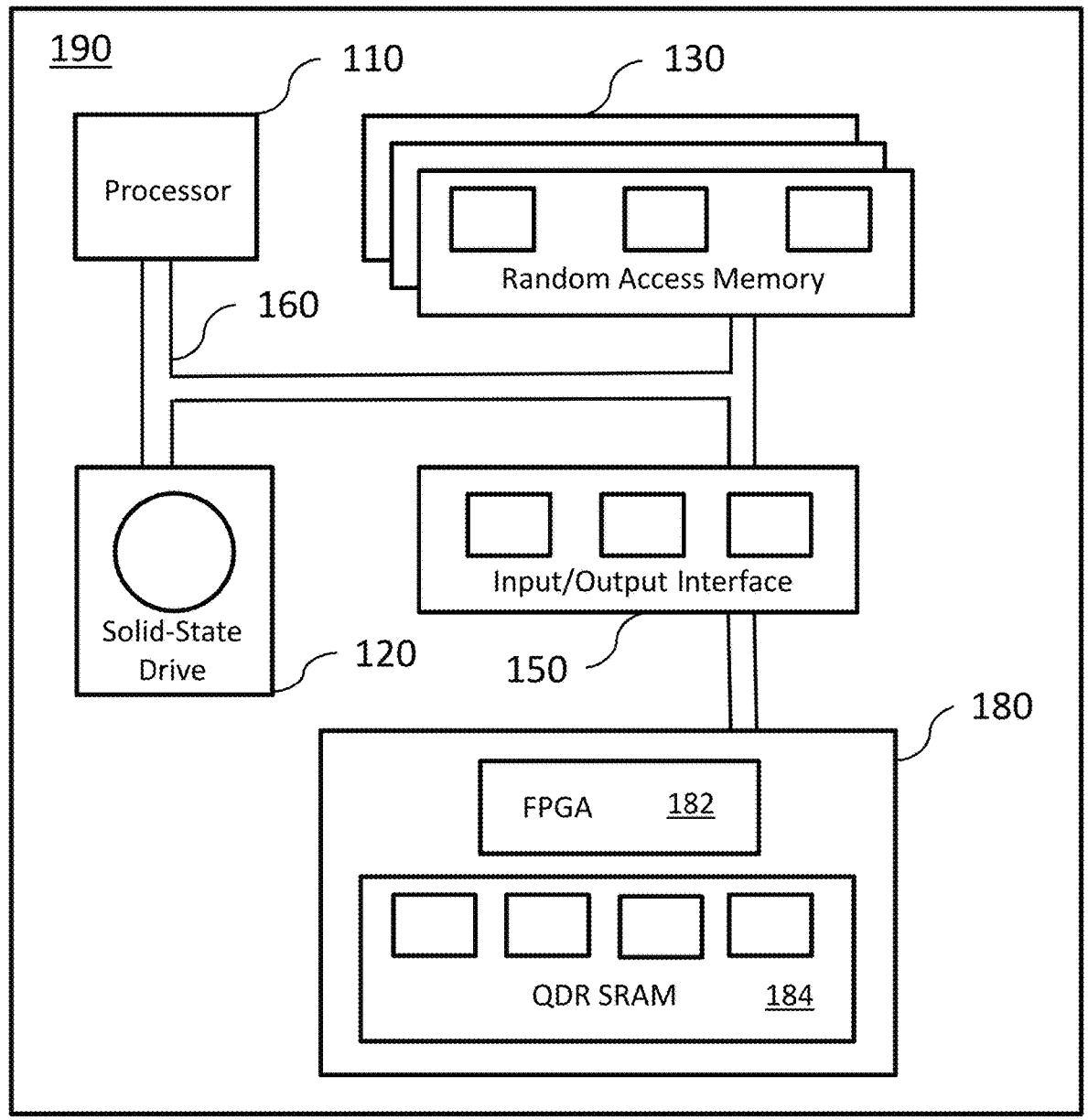

FIG. 1B illustrates a diagram of an alternative computing environment 190 in accordance with an embodiment of the present technology. In some embodiments, the computing environment 190 may be implemented by similar components as the computing environment 100 (similar components being referred to as by same number references). The computing environment 190 comprises a dedicated FPGA card 180 which may be connected to other components of the computing environment either by the Input/Output interface 150 or directly through internal and/or external buses 160. In some embodiments, the FPGA card 180 comprises a FPGA chipset 182 (which may comprise a register, also referred to as a "dedicated memory") and dedicated RAM memory such as the four distinct QDR SRAM memories collectively referred to as QDR SRAM memories 184. In some embodiments, the FPGA card may also comprise one or more input/output interfaces allowing connection to a network.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

Figure 2:
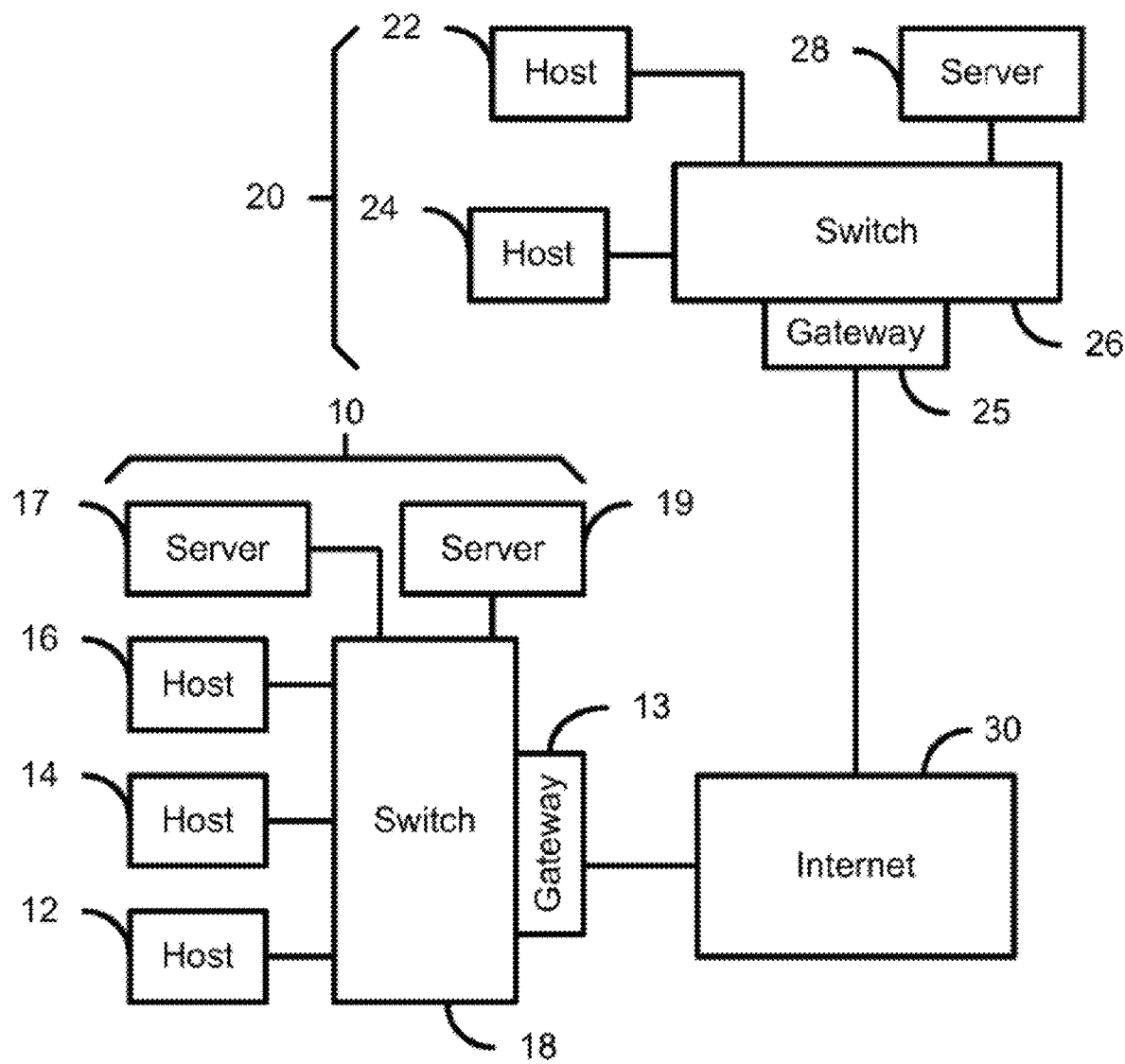
FIG. 2 illustrates a diagram of networking devices and their networking environment in accordance with embodiments of the present technology.

FIG. 2 illustrates a diagram of networking devices and their networking environment in accordance with embodiments of the present technology. Networks 10 and 20 may be connected to the Internet. Networks 10 and/or 20 may define a network associated with, controlled and operated by a datacenter. Each network 10 and 20 may comprise hosts 12, 14 and 16 and 22 and 24, respectively. Each network 10 and 20 may also comprise a switch 18 and 26, respectively, and may include one or more servers such as servers 17, 19 and 28, respectively. Each network 10 and 20 may also comprise one or more gateways 13 and 25, respectively, to the Internet 30. Not explicitly shown are routers and other portions of the networks 10 and 20 which may also control traffic through the networks 10 and 20 and which will be considered to be inherently depicted by the switches 18 and 26, respectively, and the networks 10 and 20 in general. The switches 18 and 26, the gateways 13 and 25 and the routers may generally be referred as networks of devices which may be embodied as computing devices similar to the computing environment 100. The switches 18 and 26, the gateways 13 and 25 and the routers may implement a data structure associating network packet signatures with network packet metadata in accordance with embodiments of the present technology.

Figure 3:
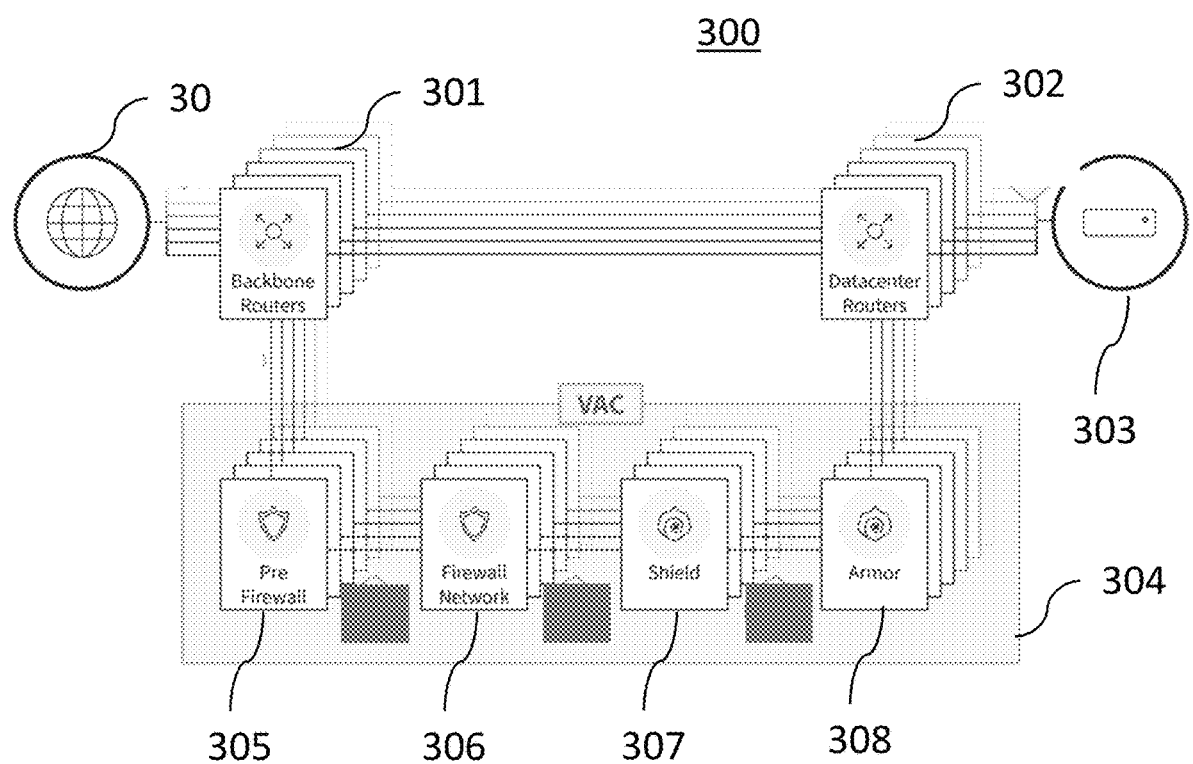
FIG. 3 illustrates a diagram of alternative networking devices and their networking environment in accordance with embodiments of the present technology.

FIG. 3 illustrates a diagram of alternative networking devices and their networking environment in accordance with embodiments of the present technology. The depicted environment is an infrastructure operating a datacenter 300 connected to the Internet 30. The datacenter 300 comprises a first set of routers 301 and a second set of routers 302. The first set of routers 301 may be referred to as backbone routers managing a plurality of distinct networks operated by the datacenter 300. The second set of routers 302 may be referred to as datacenter routers each managing network connections of a plurality of servers 303 operated by the datacenter 300. The datacenter 300 also comprises an anti-DDoS system 304 also referred to as a vacuum system VAC. In some embodiments, the anti-DDoS system 304 may be connected to the first set of routers 301 and/or to the second set of routers 304 so as to filter the network packets received from the Internet 30. In some embodiments, the anti-DDoS system 304 implements mitigation measures consisting of filtering illegitimate network packets while letting legitimate network packets access a network of the datacenter (e.g., access the servers 303). In some embodiments, the anti-DDoS system 304 may comprise a plurality of sub-systems, such as sub-systems 305-308, which may be dedicated to certain given tasks.

As an example, but without being limitative, a first sub-system 305, also referred to as a Pre-Firewall, may operate control logic aiming at fragmenting network packets, controlling size of network packets and/or authorising certain network packets based on associated protocols (e.g., TCP, UDP, ICMP, GRE protocols) while blocking other network packets (e.g., protocols other than TCP, UDP, ICMP, GRE protocols). As another example, but without being limitative, a second sub-system 306, also referred to as a Firewall network, may operate control logic aiming at authorizing/blocking IP addresses, authorizing/blocking protocols (e.g., IP, TCP, UDP, ICMP, GRE protocols), authorizing/blocking one or more network ports (e.g., TCP or UDP ports), authorizing/blocking SYN/TCP, authorizing/blocking network packets other than SYN/TCP. As another example, but without being limitative, a third sub-system 307, also referred to as Shield, may operate control logic aiming at analysing network packets (e.g., so as to check a header, a checksum, etc). As another example, but without being limitative, a fourth sub-system 308, also referred to as Armor, may operate control logic aiming at analysing network packets and/or conducting detection of invalid TCP flags, invalid sequence number, zombie network packets, TCP SYN authentication, DNS authentication, DNS limitation, etc.

In some embodiments, the fourth sub-system 308 implements a data structure associating network packet signatures with network packet metadata in accordance with embodiments of the present technology. As it may be appreciated, the data structure may equally be implemented on different networking devices or even be operated in a distributed manner over a plurality of networking devices (e.g., be implemented by one or more of the sub-systems 305-308). In some embodiment, the networking device implementing the data structure associating network packet signatures with network packet metadata in accordance with embodiments of the present technology may comprise one or more vRouters comprising FPGA cards. An example of configuration suitable for the networking device may be, without being limitative, as follows:

| Processor | 2x1697v4 |
| RAM | 64 GB DD4 ECC |
| Network Cards | 2x ConnectX-4 2x 100 Gbps |
| FPGA | XUPP3R with 4x 100 Gbps |

Other configurations may also be used and will become readily apparent to the person skilled in the art of the present technology.

Figure 4:
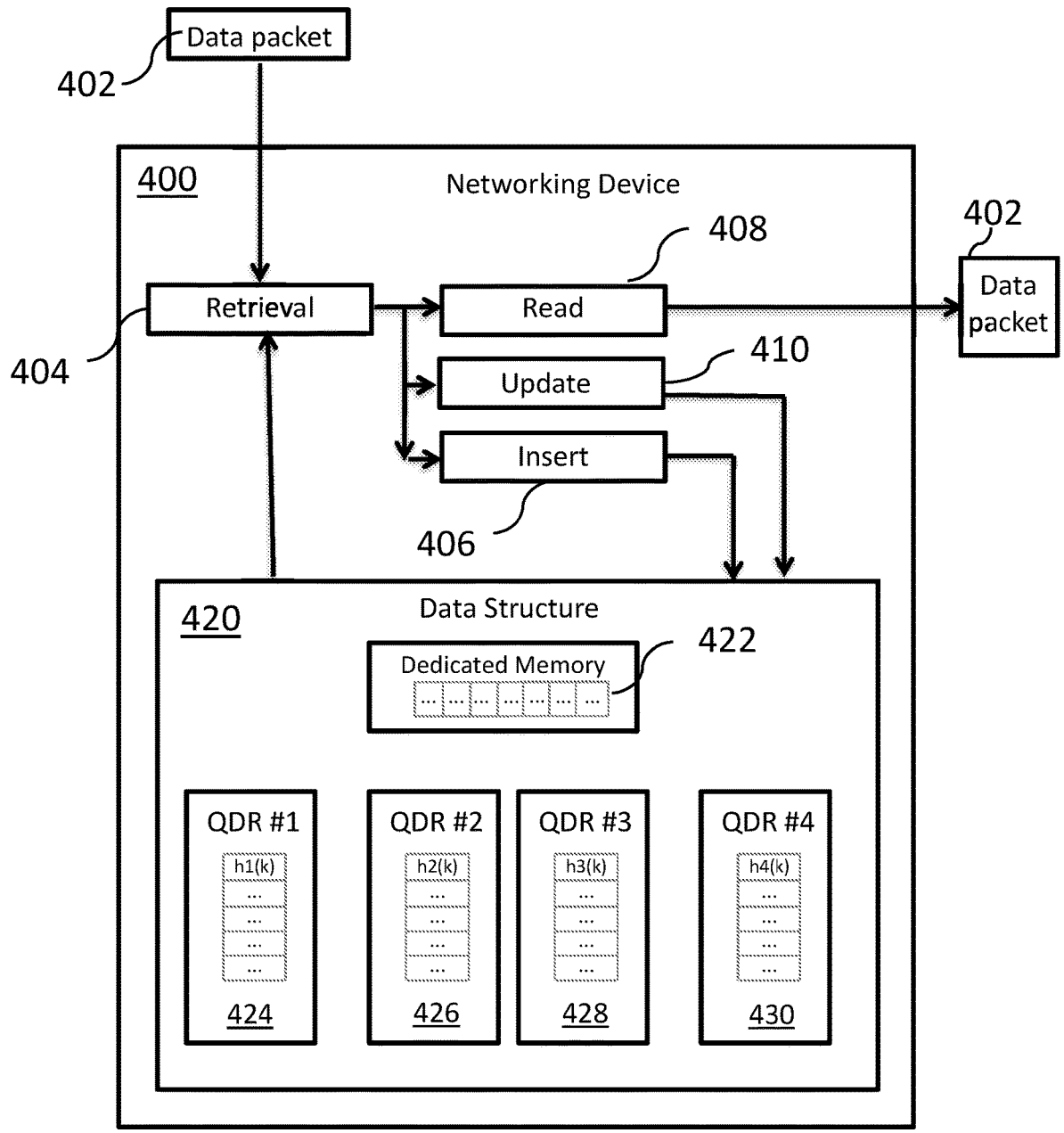
FIG. 4 illustrates a diagram of a networking device implementing a data structure in accordance with embodiments of the present technology.

Turning now to FIG. 4, a diagram of a networking device 400 implementing a data structure 420 in accordance with embodiments of the present technology is illustrated. The networking device 400 receives, through its one or more network cards, network packets such as a network packet 402. As the person skilled in the art of the present technology may appreciate, the network packet 402 may be a formatted unit of data carried by a packet-switched network comprising control information and user data. Multiple variants as to how the network packet may be implemented may be envisioned (e.g., TCP network packet, UDP network packet) without departing from the scope of the present technology.

The networking device 400 may operate multiple routines interacting with the data structure 420. The multiple routines may comprise a retrieval routine 404, an insert routine 406, a read routine 408 and an update routine 410. The data structure 420 may embody a register associating network packet signatures with network packet metadata. As an example, a request received or generated by the networking device 400 may comprise a network packet signature based on which an associated network packet metadata may be retrieved by the data structure and then be returned. The network packet signature may relate to the received data packet.

The present technology aims at alleviating at least some of the challenges related to operating a networking device managing such a data structure in the context of filtering and/or classifying network packets at a very high volume (e.g., one (1) terabit per second) and in real-time, or at least close to real-time. Embodiments of the present technology, such as the one depicted in connection with FIG. 4, provides a data structure and operations of such data structure allowing lookups and insertions in the data structure to be completed within a predefined time delay which is suitable for high volume, high speed, network packets filtering and/or classification.

In some embodiments, the routines 404-410 may be routine which may be operated alone or in combination to allow certain functions being performed on the data structure 420. The routines 404-410 may be hard coded and/or software implemented. As an example, a first operation may consist of looking up whether an element exists in the data structure 420 and, if so, returns its value, a second operation may consist of updating the value of a given element in the data structure 420, a third operation may consist of inserting an element in the data structure 420, a fourth operation may consist of deleting an element in the data structure 420.

In some embodiments, the elements stored in the data structure 420 are network packet metadata. The data structure 420 may therefore allow associating network packet signatures with network packet metadata. In some embodiments, the data structure 420 implements a hash table comprising a plurality of cells. A cell may store an element (e.g., network packet metadata) or be empty (e.g., free of any network packet metadata). The hash table may implement one or more hash functions, such as, but without being limitative, a first hash function $h1(k)$, a second hash function $h2(k)$, a third hash function $h3(k)$ and a fourth hash function $h4(k)$. In some embodiments, a key k may be a network packet signature. As a result, the network packet signature may be used by the one or more hash functions to determine a corresponding network packet metadata in the hash table. In some embodiments, the networking device 400 may perform an insertion operation consisting of inserting, in the hash table, network packet metadata associated with a network packet signature. In some approaches, a "cuckoo hashing" algorithm may be applied. The "cuckoo hashing" algorithm may cause a previously existing element of the hash table be ejected upon insertion of a new element in the hash table. The "cuckoo hashing" algorithm may then attempt to reinsert the previously existing element in the hash table. This may result in a plurality of iterations before the previously existing element may actually be reinserted in the hash table. As a result, the hash table may not be accessed up until the previously existing element is reinserted. This may impact performances of the networking device 400.

In order to alleviate some of the limitations of the "cuckoo hashing" algorithm, the present technology relies on the data structure 420 which comprises a temporary storage pipeline 422 operated in combination with a hash table. In some embodiments, the temporary storage pipeline 422 (equally referred to as "pipeline", "reinsertion pipeline", "temporary storage", "temporary pipeline") may be implemented on a dedicated memory such as a dedicated memory 422 (e.g., similar to the dedicated memory 170). In some embodiments, the hash table may be implemented on RAM memory (e.g., similar to the RAM memory 130). In some embodiments, the dedicated memory 170 is part of an FPGA processing unit. In some alternative embodiments, the temporary storage pipeline 422 and the hash table may be implemented on a same memory (e.g., on RAM memory). In alternative embodiments, the temporary storage pipeline and the hash table may be implemented on a dedicated memory (e.g., registers and/or embedded RAM of an FPGA). Multiple variations as to how the temporary storage pipeline 422 and the hash table may be implemented and stored may therefore be envisioned without departing from the scope of the present technology.

In the embodiment illustrated at FIG. 4, the hash table comprise four sub-hash tables associated with the first hash function h1(k), the second hash function h2(k), the third hash function h3(k) and the fourth hash function h4(k). Each one of the four sub-hash tables is implemented in a different memory, in this example in four distinct QDR memories QDR #1, QDR #2, QDR #3 and QDR #4. It should become apparent to the person skilled in the art of the present technology that the hash table may also comprise a different number of sub-hash tables (e.g., 2, 3, 5, etc) without departing from the scope of the present technology.

Figure 5:
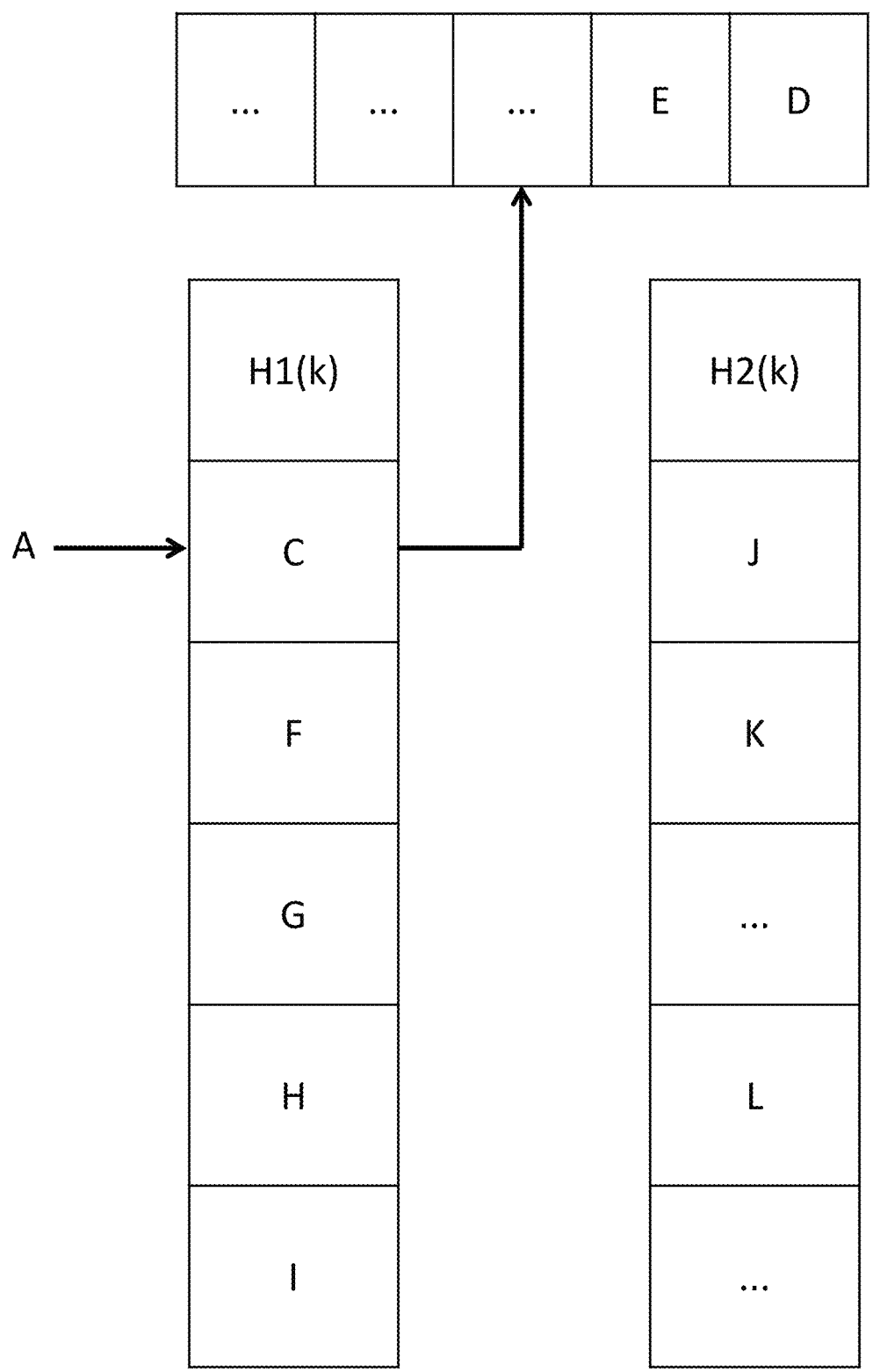
FIGS. 5-7 illustrate diagrams of operations of the data structure in accordance with embodiments of the present technology.

Referring now to FIG. 4 and FIGS. 5-7, embodiments of how the networking device 400 may be operated in accordance with the present technology will be depicted. In some embodiments, the networking device 400, upon determining that network packet metadata is to be inserted in the data structure 420 (e.g., upon determining that the network packet metadata is not already stored in the data structure 420), the networking device 400 determines a location in the hash table at which the network packet metadata is to be inserted. In some embodiments, the location is determined based on a hash function applied to a network packet signature associated with the network packet metadata. As an example, the location may be determined by using a network packet signature as key and apply the one or more hash functions h1(k), h2(k), h3(k) and h4(k) to determine a location in the hash table at which the element (i.e., the network packet metadata) is to be inserted. In the example set forth on FIG. 5, determination is made, based on the hash function h1(k) that the element "A" is to be inserted in a first cell of the first sub-hash table. In some embodiments, providing that the first cell of the first sub-hash table would have been an empty cell, the element "A" would have been inserted therein and the routine would stop until a next element is to be inserted in the hash table. In the example of FIG. 5, the first cell is not an empty cell (i.e., it contains an element "C" also referred to as a pre-existing network packet metadata). At this step, the networking device 400 does not attempt to directly reinsert the element "C" in the hash table, instead the element "C" is transferred to the temporary storage pipeline 422. In this example, the temporary storage pipeline 422 already contains elements "E" and "D" that are awaiting to be reinserted into the hash table. It should be noted that even though the element "C" is stored in the temporary storage pipeline 422 (and not in the hash table per se), the element "C" may still be accessed (e.g., if the networking device 400 processes a request requiring to look up the element "C") thereby providing a data structure which may remain available even though at least certain elements have not yet been reintroduced into the hash table. As the element "C" has been transferred to the temporary storage pipeline 422, the cell of the hash table previously occupied by the element "C" is now free. The networking device 400 may then insert element "A" in the first cell of the first sub-hash table.

In alternative embodiments, multiple locations at which an element is to be inserted are determined. For example, determination is made, based on the hash function h1(k) and h2(k) that an element may be inserted in either a cell of the first sub-hash table or a cell of the second sub-hash table. Providing that either the cell of the first sub-hash table or the cell of the second sub-hash table is empty, the element is inserted without further actions. If both the cell of the first sub-hash table and the cell of the second sub-hash table are not empty then a pre-existing element from either the cell of the first sub-hash table or the cell of the second sub-hash table is transferred to the temporary storage pipeline so as to allow insertion of the element in emptied cell. In some embodiments, the determination is made randomly.

Figure 6:
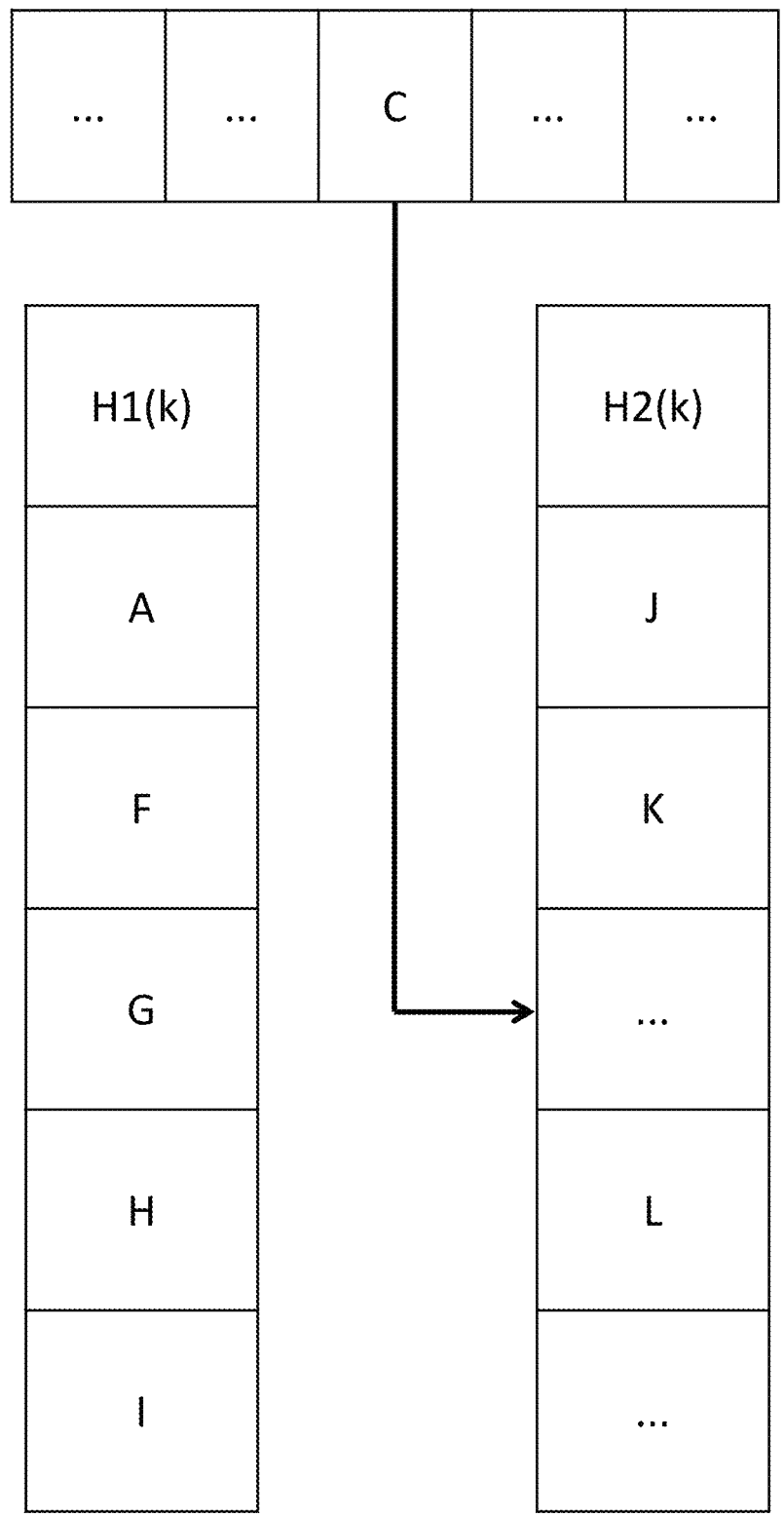
Figure 7:
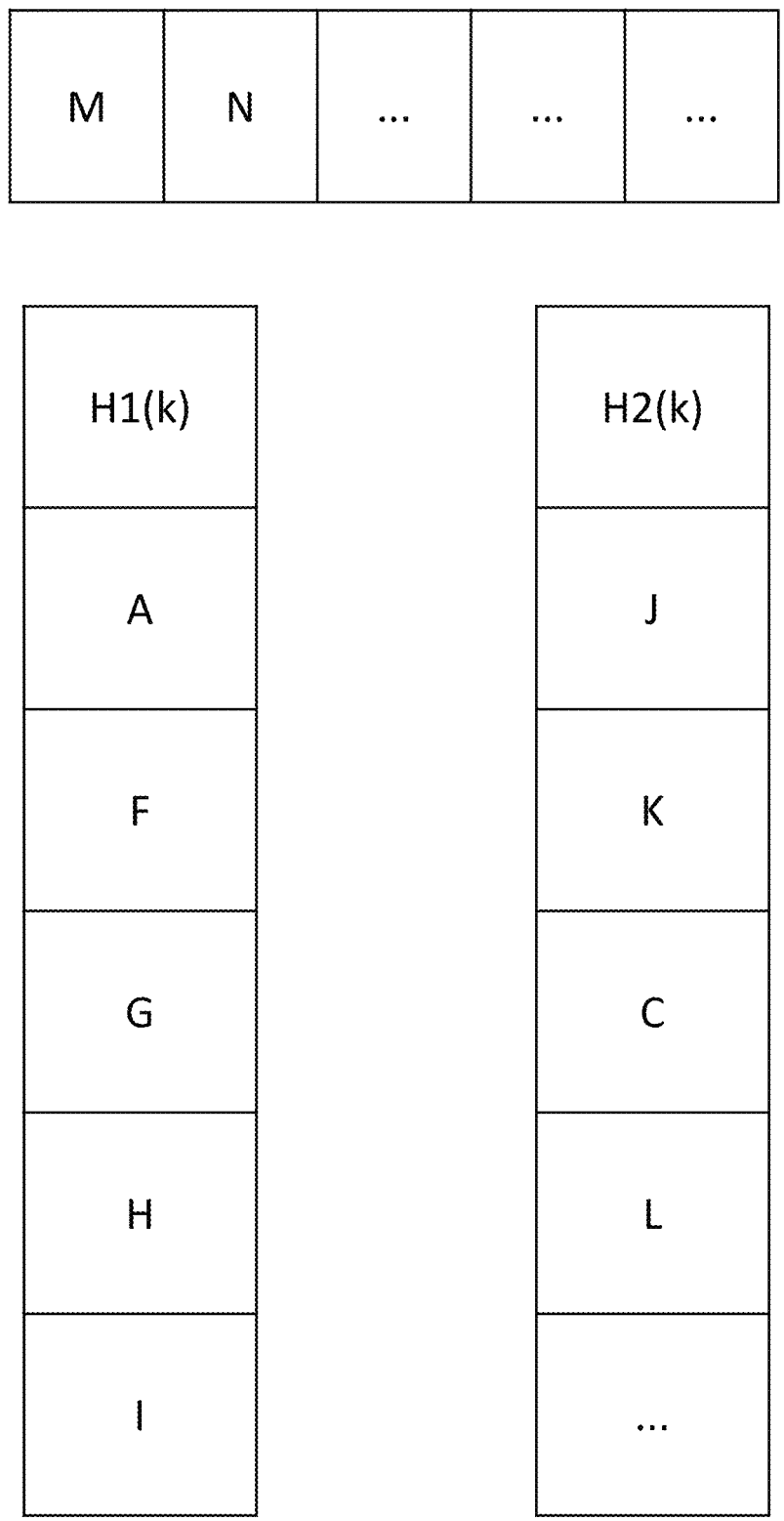

As exemplified by FIGS. 6 and 7, the networking device 400 operates a reinsertion routine on the temporary storage pipeline 42. The reinsertion routine may be hard coded and/or software implemented. The reinsertion routine may comprise a step of reinserting one or more elements contained in the temporary storage pipeline 422 in the hash table. In embodiments wherein the temporary storage pipeline 422 comprises a first in, first out (FIFO) data buffer, the step of reinserting is executed so that a latest element (e.g., pre-existing network packet metadata) transferred into the temporary storage pipeline 422 is the latest to be reinserted in the hash table. In the example of FIGS. 5-7, elements "D" and "E" will be reinserted before the element "C". Elements "N" and "M" will be reinserted after element "C". In some embodiments, the reinsertion routine is executed asynchronously and in a non-blocking manner. In other words, the reinsertion routine does not preclude access to the temporary storage pipeline 422 thereby allowing reading, updating and/or deleting of elements of the temporary storage pipeline 422 even though the elements have not yet been reinserted into the hash table. The present technology resolves at least some deficiency of prior approaches as the data structure 420 remains accessible at all time and does not require a completion of a reinsertion before allowing reading, updating and/or deleting of elements contained in the data structure.

Continuing with the example of FIGS. 6 and 7, determination is made by the reinsertion routine that a third cell of the second sub-hash table is free. The reinsertion routine may undertake to reinsert element "C" into the second sub-hash table thereby freeing a cell of the temporary storage pipeline 422. In some embodiments, the temporary storage pipeline 422 acts as an extension of the hash table by allowing maintaining access to an element even though it has not yet been reinserted in the hash table. In some embodiments, an element of the temporary storage pipeline 422 may be read, updated and/or deleted as if it was already inserted in the hash table.

In some embodiments, the reinsertion routine may implement logic allowing to count a number of reinsertion attempts and implement a threshold (e.g., a number of reinsertion attempts) to determine that an element may be "abandoned" thereby emptying the temporary storage pipeline 422 even though the element has not been reintroduced in the hash table.

In some embodiments, the size of the dedicated memory implementing the temporary storage pipeline 422 and the size of the RAM memory implementing the hash table is optimized so as to limit a number of cell uselessly maintained empty by previous approaches. As a result, the size of the dedicated memory and/or the RAM memory may be less than with conventional approaches as reinsertion is more predictable.

Figure 8:
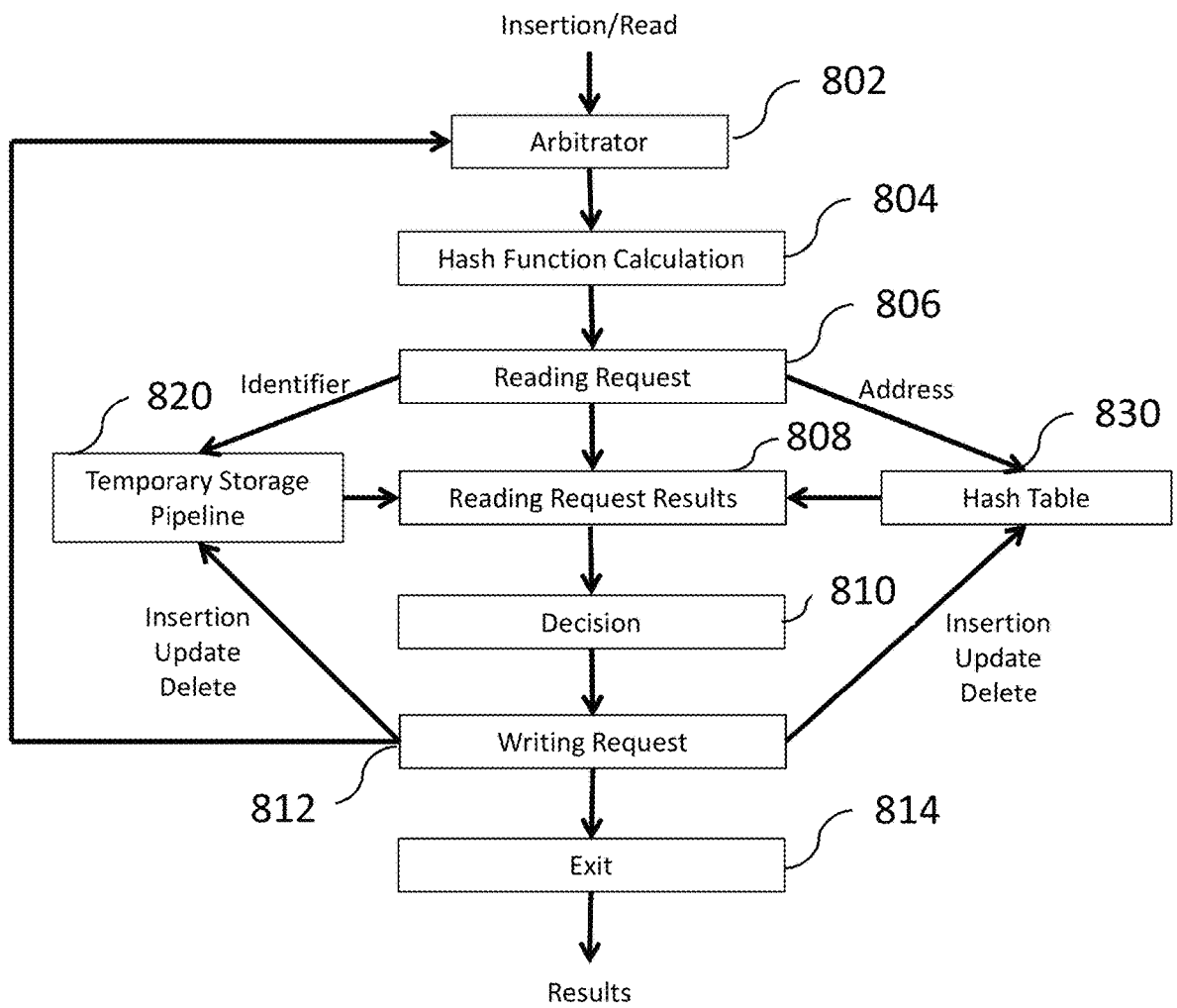
FIG. 8 illustrates a first flow diagram of a method for operating a networking device in accordance with embodiments of the present technology.

Turning now to FIG. 8, a first flow diagram of a method 800 for operating a networking device 400 in accordance with embodiments of the present technology. In some embodiment, the method 800 starts upon receiving an insertion request and/or a read request. At a step 802, a step 802 referred to as "arbitrator" allows prioritization of received requests. In some embodiments, the step 802 may prioritize insertion requests. At a step 804, a hash function is applied to a key (e.g., a key received as part of the insertion request and/or a read request) to form a read request formed at step 806 (in this example, forming a read request is part of steps to be executed to complete an insertion). The read request may point to a temporary storage pipeline 820 (e.g., the temporary storage pipeline 422) by generating an identifier. The read request may also point to a hash table 830 (e.g., the hash table defined by sub-hash tables 424-430) by generating an address. In some embodiments, whether an identifier or an address is generated depends on where the element identified at the step 804 is located (e.g., in the temporary storage pipeline 820 or in the hash table 830). In some alternative embodiments, both an identifier and an address are generated. In some embodiments, when a read request is received, if data is found in the temporary storage pipeline 820 it is then returned in response to the read request, if nothing is found in the temporary storage pipeline 820 then the hash table 830 is looked up. As a result, an identifier may locate an element in the temporary storage pipeline 820 while an address may locate an element in the hash table 830.

At step 808, reading request result(s) is/are returned from either the temporary storage pipeline 820 and/or the hash table 830. In some embodiments, if an element exists in the temporary storage pipeline 820 and in the hash table 830, the method 800 only retains the value stored in the temporary storage pipeline 820, if an element exists in the hash table 830 but not in the temporary storage pipeline 820, the method retains the value stored in the hash table 830. The reading request result(s) may be analysed at step 810 (e.g., to determine whether a location in the temporary storage pipeline 820 and/or the hash table 830 is empty). A writing request may then be generated at step 812, the writing request allowing insertion, update and/or deletion in either the temporary storage pipeline 820 and/or the hash table 830. As the writing request may result in an element being transferred from the hash table 830 to the temporary storage pipeline 820, the step 812 may cause a reinsertion request being processed by the arbitrator of step 802 so that the transferred element be reinserted in the hash table 830 in accordance with the method detailed in the previous paragraph. The method 800 may exit at step 814 by returning results (e.g., confirmation that an insertion or a reinsertion has been conducted, a value read from the temporary storage pipeline 820 or the hash table 830).

Turning now to FIG. 9, a flow diagram of a method for operating a networking device according to one or more illustrative aspects of the present technology is disclosed. In one or more embodiments, the method 900 or one or more steps thereof may be performed by one or more computing devices or entities. For example, portions of the method 900 may be performed by components of the networking device 400. The method 900 or one or more steps thereof may be embodied in computer-executable instructions that are stored in a computer-readable medium, such as a non-transitory computer-readable medium. Some steps or portions of steps in the flow diagram may be omitted or changed in order.

In one or more embodiments, the networking device comprises a data structure associating network packet signatures with network packet metadata, the data structure comprising a temporary storage pipeline and a hash table stored in a computer-readable memory.

At step 902, upon determining that network packet metadata is to be inserted in the data structure, the method 900 determines a location in the hash table at which the network packet metadata is to be inserted. The location is determined based on a hash function applied to a network packet signature associated with the network packet metadata.

At step 904, if the location in the hash table is an empty cell, the method 900 inserts the network packet metadata in the empty cell.

At step 906, if the location in the hash table is not an empty cell, the method 900 executes steps 908 and 910. At step 908, the method 900 transfers the pre-existing network packet metadata from the hash table to the temporary storage pipeline. At step 910, the method 900 inserts the network packet metadata at the location of the hash table freed from the pre-existing network packet metadata.

Step 912 is executed by the method 900 so as to operate a reinsertion routine on the temporary storage pipeline. In some embodiments, the reinsertion routine allows reinserting the pre-existing network packet metadata into the hash table.

In some embodiments, further steps 900 are executed. For example, the method 900 may determine a reinsertion location in the hash table at which the pre-existing network packet is to be reinserted. In some embodiments, each time an insertion or reinsertion is done, multiple hashes (e.g., four in the above-embodiment) are computed. So there are four possible slots. In some embodiments, these may be the four locations where the element may be stored. If a slot is empty, insertion is completed in that slot. If no slot is empty, one of the four slots is chosen randomly and replaced. The replaced element will then be reinserted. For the replaced element, the slot it was using is now unavailable. If one of the three others is available, it is used. If not, one of the four elements is chosen randomly. It is therefore possible that it will again replace the same element that just got inserted. In some embodiments, a count on probabilities may be put in place to prevent that situation to occur too frequently. In some embodiments, if determination is made that an insertion loops forever, it is stopped at some point of time (e.g., by defining a maximum number of reinsertion attempts).

If the reinsertion location in the hash table is not an empty cell, then the method 900 executes steps of (1) transferring a second pre-existing network packet metadata occupying the reinsertion location from the hash table to the temporary storage pipeline; (2) inserting a first pre-existing network packet metadata at the reinsertion location of the hash table freed from the second pre-existing network packet metadata; and (3) operating the reinsertion routine on the temporary storage pipeline to reinsert the second pre-existing network packet metadata into the hash table.

In some embodiments, the temporary storage pipeline comprises a first in, first out (FIFO) data buffer and the reinsertion routine is executed so that a latest pre-existing network packet metadata transferred into the temporary storage pipeline is the latest to be reinserted in the hash table.

In some embodiments, upon determining that a second network packet metadata is to be looked up in the data structure, the method 900 further executes steps of looking up at least one of the temporary storage pipeline and/or the hash table; and/or identifying a location of the at least one of the temporary storage pipeline and/or the hash table at which the second network packet metadata is located.

In some embodiments, the network packet signature is a first network packet signature and the looking up the at least one of the temporary storage pipeline and/or the hash table comprises applying the hash function to a second network packet signature associated with the second network packet metadata.

In some embodiments, upon determining that the second network packet metadata is to be updated, the method 900 replaces the second network packet metadata by inserting a third network packet metadata at the location of the at least one of the temporary storage pipeline and/or the hash table at which the second network packet metadata is located.

In some embodiments, upon determining that the second network packet metadata is to be deleted, the method 900 empties the location of the at least one of the temporary storage pipeline and/or the hash table at which the second network packet metadata is located.

In some embodiments, the computer-readable memory comprises a dedicated memory for storing the temporary storage pipeline and a Random-Access Memory (RAM) for storing the hash table. In some embodiments, the RAM comprises at least a first Quad Data Rate (QDR) SRAM memory and a second QDR SRAM memory. In some embodiments, the hash table comprises a first sub-hash table stored in the first memory and a second sub-hash table stored in the second memory.

In some embodiments, the hash function comprises a first sub-hash function directing to the first sub-hash table and a second sub-hash function directing to the second sub-hash table.

In some embodiments, determining the location in the hash table at which the network packet metadata is to be inserted comprises applying the first sub-hash function to the network packet signature to generate a first sub-hash table location associated with the first sub-hash table and applying the second sub-hash function to the network packet signature to generate a second sub-hash table location associated with the second sub-hash table.

In some embodiments, determining if the location in the hash table is an empty cell comprises determining if one of the first sub-hash table location and the second sub-hash table location is an empty cell, and wherein inserting the network packet metadata in the empty cell comprises inserting the network packet metadata in one of the first sub-hash table location and the second sub-hash table location.

In some embodiments, determining if the location in the hash table is not an empty cell comprises determining if none of the first sub-hash table location and the second sub-hash table location is an empty cell, and wherein transferring the pre-existing network packet metadata from the hash table to the temporary storage pipeline comprises transferring the pre-existing network packet metadata from one of the first sub-hash table and the second sub-hash table to the temporary storage pipeline.

Although example embodiments are described above, the various features and steps may be combined, divided, omitted, rearranged, revised, or augmented in any desired manner, depending on the specific outcome or application. Various alterations, modifications, and improvements will readily occur to those skilled in the art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method of analysing network packets for preventing network attacks by filtering out illegitimate network packets while permitting legitimate network packets access to a network, comprising:
    providing a data structure configured to associate network addresses with data packet classifications indicative as to whether a network packet is legitimate, the data structure comprising a hash table and a separate temporary storage pipeline stored in a computer readable memory;
    upon determining that a data packet classification is to be inserted in the data structure, determining a hash table location at which the data packet classification is to be inserted, the hash table location being determined based on a hash function applied to a network address associated with the data packet classification, wherein:
    responsive to determining that the determined hash table location is an empty cell, inserting the data packet classification in the empty cell;
    responsive to determining that the determined hash table location is not an empty cell:
        transferring a pre-existing data packet classification from the determined hash table location to the temporary storage pipeline in which the pre-existing data packet classification remains accessible for operations;
        inserting the data packet classification at the determined hash table location freed from the pre-existing data packet classification; and
        executing a reinsertion routine on the temporary storage pipeline to reinsert the transferred pre-existing data packet classification back into the hash table.

2. The method of claim 1, wherein the pre-existing data packet classification is a first pre-existing data packet classification and further comprising:
    determining a reinsertion location in the hash table at which the first pre-existing data packet classification is to be reinserted;
    responsive to determining that the reinsertion location in the hash table is not an empty cell:
        transferring a second pre-existing data packet classification occupying the reinsertion location from the hash table to the temporary storage pipeline;
        inserting the first pre-existing data packet classification at the reinsertion location of the hash table freed from the second pre-existing data packet classification; and executing the reinsertion routine on the temporary storage pipeline to reinsert the second pre-existing data packet classification into the hash table.

3. The method of claim 1, wherein the temporary storage pipeline comprises a first in, first out (FIFO) data buffer and the reinsertion routine is executed, wherein a latest pre-existing data packet classification transferred into the temporary storage pipeline is the latest to be reinserted in the hash table.

4. The method of claim 1, wherein the data packet classification is a first data packet classification and wherein the method further comprises:
upon determining that a second data packet classification is to be looked up in the data structure:
looking up at least one of the temporary storage pipeline and/or the hash table; and
identifying a location of the at least one of the temporary storage pipeline and/or the hash table at which the second data packet classification is located.

5. The method of claim 1, wherein the network address is a first network address and wherein a looking up the at least one of the temporary storage pipeline and/or the hash table comprises applying the hash function to a second network address associated with a second data packet classification.

6. The method of claim 4, further comprising:
upon determining that the second data packet classification is to be updated, replacing the second data packet classification by inserting a third data packet classification at the location of the at least one of the temporary storage pipeline and/or the hash table at which the second data packet classification is located.

7. The method of claim 4, further comprising:
upon determining that the second data packet classification is to be deleted, emptying the location of the at least one of the temporary storage pipeline and/or the hash table at which the second data packet classification is located.

8. The method of claim 1, wherein the computer-readable memory comprises a dedicated memory for storing the temporary storage pipeline and a Random-Access Memory (RAM) for storing the hash table.

9. The method of claim 8, wherein the RAM comprises at least a first Quad Data Rate (QDR) SRAM memory and a second QDR SRAM memory.

10. The method of claim 9, wherein the hash table comprises a first sub-hash table stored in a first memory and a second sub-hash table stored in a second memory.

11. The method of claim 10, wherein the hash function comprises a first sub-hash function directing to the first sub-hash table and a second sub-hash function directing to the second sub-hash table.

12. The method of claim 11, wherein the determining the hash table location at which the data packet classification is to be inserted comprises applying the first sub-hash function to the network address to generate a first sub-hash table location associated with the first sub-hash table and applying the second sub-hash function to the network address to generate a second sub-hash table location associated with the second sub-hash table.

13. The method of claim 12, wherein the determining the hash table location is an empty cell comprises determining if one of the first sub-hash table location and the second sub-hash table location is an empty cell, and wherein inserting the data packet classification in the empty cell comprises inserting the data packet classification in one of the first sub-hash table location and the second sub-hash table location.

14. The method of claim 13, wherein the determining the hash table location is not an empty cell comprises determining if none of the first sub-hash table location and the second sub-hash table location is an empty cell, and wherein transferring the pre-existing data packet classification from the hash table to the temporary storage pipeline comprises transferring the pre-existing data packet classification from one of the first sub-hash table and the second sub-hash table to the temporary storage pipeline.

15. A method of operating a networking device to prevent network attacks by filtering out illegitimate network packets while permitting legitimate network packets access to a network, comprising:
providing a data structure configured to associate network addresses with network packet metadata indicative as to whether a network packet is legitimate, the data structure comprising a hash table and a separate temporary storage pipeline;
upon determining that a particular network packet metadata is to be inserted in the data structure, determining a hash table location at which the particular network packet metadata is to be inserted, the hash table location being determined based on a hash function applied to a network address associated with the particular network packet metadata, wherein:
responsive to determining that the determined hash table location is an empty cell, inserting the particular network packet metadata in the empty cell;
responsive to determining that the determined hash table location is not an empty cell:
transferring a pre-existing network packet metadata from the determined hash table location to the temporary storage pipeline in which the pre-existing network packet metadata remains accessible for operations;
inserting the particular network packet metadata at the determined hash table location freed from the pre-existing network packet metadata; and
executing a reinsertion routine on the temporary storage pipeline to reinsert the transferred pre-existing network packet metadata back into the hash table.

16. A system for analysing network packets for preventing network attacks by filtering out illegitimate network packets while permitting legitimate network packets access to a network, comprising:
a non-transitory computer-readable medium storing a data structure configured to associate network addresses with data packet classifications indicative as to whether a network packet is legitimate, the data structure comprising a hash table and a separate temporary storage pipeline;
a processor configured to execute control logic to:
determine that a data packet classification is to be inserted in the data structure;
determine a hash table location at which the data packet classification is to be inserted, the hash table location being determined based on a hash function applied to a network address associated with the data packet classification, wherein:
responsive to determining that the determined hash table location is an empty cell, inserting the data packet classification in the empty cell;
responsive to determining that the location in the hash table is not an empty cell:
transferring a pre-existing data packet classification from the determined hash table location to the temporary storage pipeline in which the pre-existing data packet classification remains accessible for operations;

inserting the data packet classification at the determined hash table location freed from the pre-existing data packet classification; and executing a reinsertion routine on the temporary storage pipeline to reinsert the transferred pre-existing data packet classification back into the hash table.

17. The system of claim 16, wherein the pre-existing data packet classification is a first pre-existing data packet classification and further comprising:

determining a reinsertion location in the hash table at which the first pre-existing data packet classification is to be reinserted;

responsive to determining that the reinsertion location in the hash table is not an empty cell:

transferring a second pre-existing data packet classification occupying the reinsertion location from the hash table to the temporary storage pipeline;

inserting the first pre-existing data packet classification at the reinsertion location of the hash table freed from the second pre-existing data packet classification; and executing the reinsertion routine on the temporary storage pipeline to reinsert the second pre-existing data packet classification into the hash table.

18. The system of claim 16, wherein the temporary storage pipeline comprises a first in, first out (FIFO) data buffer and the reinsertion routine is executed so that a latest pre-existing data packet classification transferred into the temporary storage pipeline is the latest to be reinserted in the hash table.

19. The system of claim 16, wherein the data packet classification is a first data packet classification and wherein the method further comprises:

upon determining that a second data packet classification is to be looked up in the data structure:

looking up at least one of the temporary storage pipeline and/or the hash table; and identifying a location of the at least one of the temporary storage pipeline and/or the hash table at which the second data packet classification is located.

20. The system of claim 16, wherein the network address is a first network address and wherein a looking up the at least one of the temporary storage pipeline and/or the hash table comprises applying the hash function to a second network address associated with a second data packet classification.

* * * * *

UNITED STATES PATENT AND TRADEMARK OFFICE
CERTIFICATE OF CORRECTION

| | | |
|---|---|---|
| PATENT NO. | : 11,811,733 B2 | Page 1 of 1 |
| APPLICATION NO. | : 16/546894 | |
| DATED | : November 7, 2023 | |
| INVENTOR(S) | : Thibault Chapel et al. | |

It is certified that error appears in the above-identified patent and that said Letters Patent is hereby corrected as shown below:

In the Claims

Column 17, Claim 13, Line 60 should read --The method of claim 12, wherein the determining if the--

Column 18, Claim 14, Line 1 should read --The method of claim 13, wherein the determining if the--

Signed and Sealed this
Sixth Day of February, 2024

Katherine Kelly Vidal
*Director of the United States Patent and Trademark Office*